(12) United States Patent
Fox

(10) Patent No.: US 7,850,147 B1
(45) Date of Patent: Dec. 14, 2010

(54) BOAT LIFTING APPARATUS

(75) Inventor: Charles A. Fox, Stockton, MO (US)

(73) Assignee: Superior Gearbox Company, Stockton, MI (US)

( * ) Notice: Subject to any disclaimer, the term of this patent is extended or adjusted under 35 U.S.C. 154(b) by 0 days.

(21) Appl. No.: 12/197,244

(22) Filed: Aug. 23, 2008

(51) Int. Cl.
*B66D 1/14* (2006.01)

(52) U.S. Cl. .................... 254/343; 254/296
(58) Field of Classification Search .......... 254/296, 254/343; 74/724, 425
See application file for complete search history.

(56) References Cited

U.S. PATENT DOCUMENTS

| | | | |
|---|---|---|---|
| 3,697,049 A * | 10/1972 | Wallace | 254/343 |
| 4,132,322 A | 1/1979 | Loesch et al. | |
| 4,353,526 A | 10/1982 | Weidmann | |
| 4,625,946 A | 12/1986 | Clark, Jr. et al. | |
| 5,005,777 A | 4/1991 | Fernandez | |
| 5,065,703 A | 11/1991 | Lee | |
| 5,296,057 A * | 3/1994 | Baba et al. | 148/436 |
| 5,370,366 A | 12/1994 | Ottemann | |
| 5,537,901 A | 7/1996 | Cichowicz et al. | |
| 5,551,917 A | 9/1996 | Wood | |
| 5,669,033 A * | 9/1997 | Takata et al. | 396/612 |
| 5,769,568 A | 6/1998 | Parkins et al. | |
| 5,794,919 A | 8/1998 | Hauck | |
| 5,803,437 A * | 9/1998 | Paterson et al. | 254/343 |
| 5,806,402 A | 9/1998 | Henry | |
| 5,970,813 A | 10/1999 | Parkins et al. | |
| 6,435,768 B1 * | 8/2002 | Mansfield | 405/3 |
| 6,484,608 B1 * | 11/2002 | Ziavras | 74/810.1 |
| 6,698,306 B2 * | 3/2004 | Tatsuda | 74/427 |
| 7,377,194 B2 * | 5/2008 | Shimizu et al. | 74/409 |
| 2003/0233899 A1 * | 12/2003 | Ishiyama | 74/425 |
| 2005/0267518 A1 | 12/2005 | Wright et al. | |
| 2006/0156846 A1 | 7/2006 | Neubauer et al. | |

FOREIGN PATENT DOCUMENTS

| | | | |
|---|---|---|---|
| CN | 201368187 Y | * | 12/2009 |
| JP | 2000-8071 | * | 1/2000 |
| JP | 2000008071 A | * | 1/2000 |
| SU | 389716 A | * | 9/1976 |
| SU | 389716 A | * | 9/1976 |

* cited by examiner

*Primary Examiner*—Emmanuel M Marcelo
(74) *Attorney, Agent, or Firm*—Polster, Lieder, Woodruff & Lucchesi, L.C.

(57) ABSTRACT

This boat lift drive is used for raising and lowering a wide range of boat size. The boat drive is a two stage worm system and uses a drive motor having a motor shaft driving a first worm and a first worm wheel as a first stage, and driving a second worm and a second worm wheel, as second stage. At least one of said worm shafts has a copper alloy intermediate worm portion. A third stage is provided having a spool driven by the second worm wheels, the spool having a cable disposed thereabout for lifting the boat.

5 Claims, 7 Drawing Sheets

FIG 7

| ITEM | DESCRIPTION |
|---|---|
| 1 | Housing, Mach |
| 2 | Cover, Housing, Mach |
| 3 | Cover, Endcap, Mach |
| 4 | Adapter, Motor, Mach |
| 5 | Shaft, Worm, Input |
| 6 | Gear, Wheel, 5:1 |
| 7 | Shaft, Bronze Worm, Input/Output |
| 8 | Gear, Wheel, 96:1 |
| 9 | Bearing, Ball Double Sealed 6017-2RS |
| 10 | Bearing, Ball Double Sealed 6006-2RS |
| 11 | Bearing, Ball 6204 |
| 12 | Seal 85mm-100mm-9mm |
| 13 | Seal 35mm-47mm-7mm (CR 13938) |
| 14 | Endcap, Rubber coated 80mm x 10mm x 2mm |
| 15 | Endcap, Rubber coated 47mm x 7mm x 2mm |
| 16 | Nut, Slotted, M12-1.75 |
| 17 | Key, .315 x .276 x .750 |
| 18 | Spacer, 31.75mm, ID-25mm x OD-35mm |
| 19 | Washer, M10, Flat, DIN 125 Stainless Steel |
| 20 | Bolt, M6-1.0 x 25 SHCS, Stainless Steel S30400 |
| 21 | Bolt, M10-1.5 x 30 SHCS, Stainless Steel S30400 |
| 22 | Retaining Ring, Internal Ø47mm Bore (HO-185) |
| 23 | Retaining Ring, External Ø20mm Shaft (DSH-20) |
| 24 | Plug, M48 X 2 Sq Head, Stainless Steel |
| 25 | Plug, M20 X 1.5 Sq Head, Stainless Steel |
| 26 | Washer, Flat, Stainless Steel M6 |
| 27 | Pin, Cotter 1/8 x 1.00 |
| 28 | Spacer, 2mm, ID-20.2mm x OD-28mm |
| 29 | Washer, M12 |
| 30 | Plug, M26 X 1.5 Sq Head, Stainless Steel |
| 31 | Bearing, Tapered Roller #30206 |
| 32 | Washer, Rubber 25 x 18 x 1 |
| 33 | Washer, Rubber 40 x 24 x 1 |
| 34 | Washer, Rubber 58 x 46 x 1 |
| 35 | Bolt, M6-1.0 x 10 HHCS, Stainless Steel S30400 |
| 36 | Cover, Output |
| 37 | Bolt, 5/8-18 x 4, Grade 5 |
| 38 | Bolt |
| 39 | Spool |
| 40 | Drive Tube |
| 41 | Cable |

…

BOAT LIFTING APPARATUS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

There are several patents directed to boat lift apparatus but only two are believed to be pertinent for discussion. The first patent is U.S. Pat. No. 5,970,813 which discloses a drive system that can be used for raising cable supported loads. Disclosed in this arrangement is a motor and belt driven wheel providing a first stage which drives a worm and worm wheel providing a second stage drive system. The worm and worm wheel are connected to a back plate support, which is composed of a high thermal conductivity metal, such as aluminum, to facilitate heat transfer. The second patent is U.S. Pat. No. 6,397,691 which discloses a double reduction gear drive means and includes two gear reduction mechanisms. The gear drive is a direct drive system which utilizes direct engagement between two adjacently positioned pairs of gears, each of which reduces rotational speed. Again, only one worm gear is used.

BRIEF SUMMARY OF THE INVENTION

Briefly stated, the present invention provides a boat lift having three stages, the first stage comprising a first worm and a first worm wheel, a second stage comprising a second worm and a second worm wheel and a third stage comprising a cable spool. The second worm is provided with a copper alloy worm drive portion engaging a worm wheel.

It is an aspect of this invention that a motor, preferably an electric motor drives the first stage.

It is another aspect of this invention that the third stage is driven by the second stage.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 7 is a parts list of the boat lift drive system.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
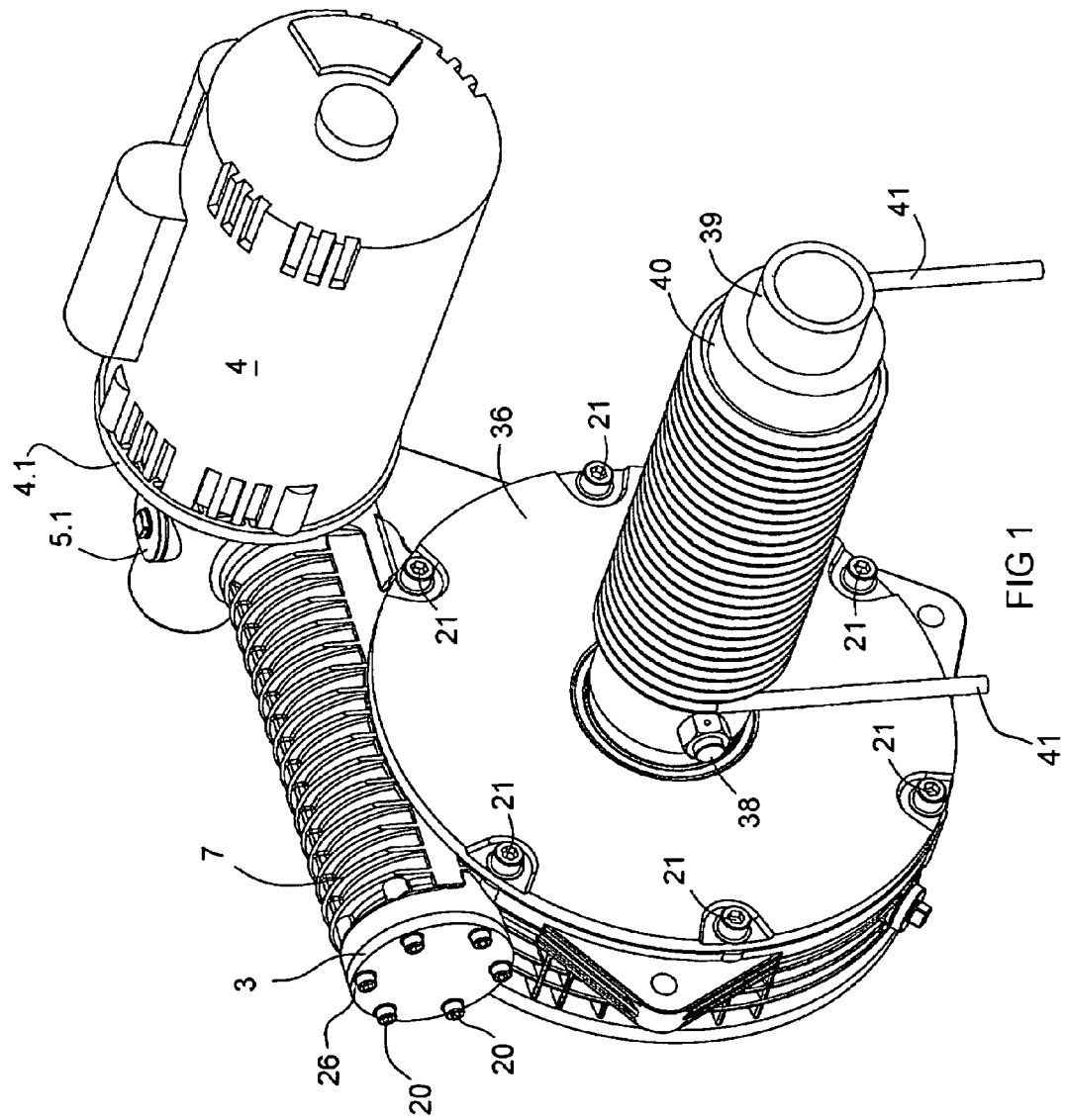
FIG. 1 is a perspective view of the boat lift drive system showing both drive stages.
Figure 2:
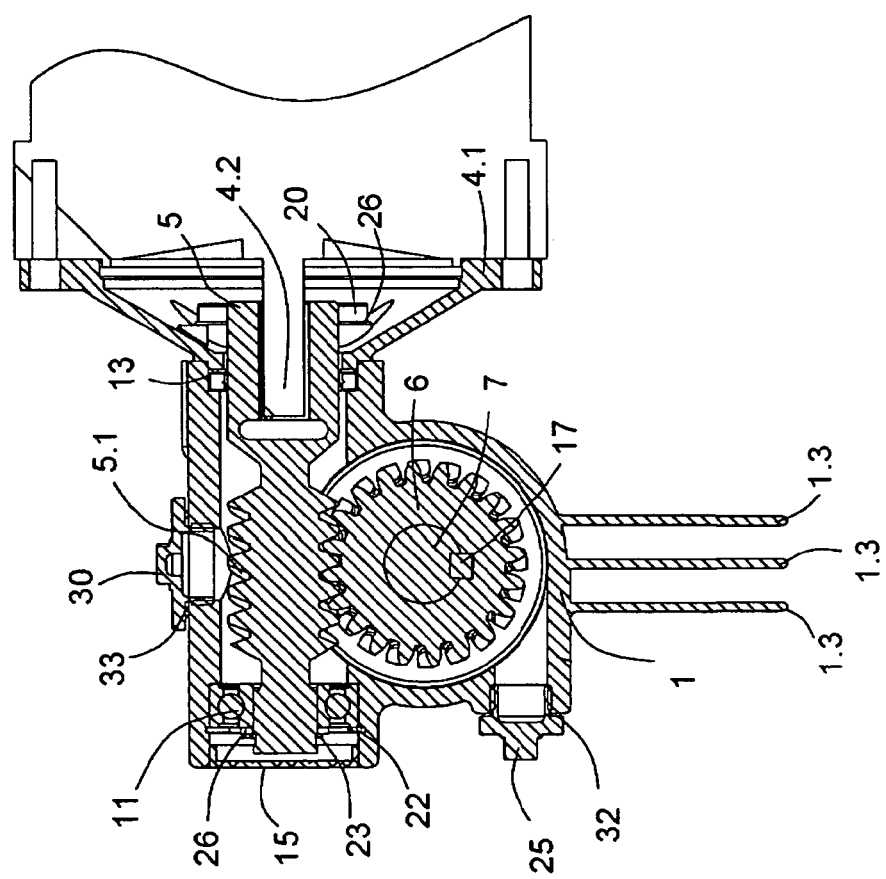
FIG. 2 is a cross sectional view taken on line 2-2 of FIG. 4 showing the first drive stage.

Referring now by reference numerals to the drawings and first to FIGS. 1 and 2 will be understood the drive system is divided into three stages, Stage 1, Stage 2 and Stage 3 for simplicity. Stage 1 is the first worm/worm wheel stage, Stage 2 is the second worm/worm wheel stage and Stage 3 is the cable lift stage. Copper alloy, for example bronze, is the metal which is primarily used for the stage 2 worm. However, copper alloy is not limited to bronze. In addition, it may also be used for the first stage worm. In addition, copper alloy may also be used for the first stage worm and worm wheel.

Stage 1 includes the drive motor 4 having a motor adaptor 4.1 and motor shaft 4.2 coupled to the worm shaft 5 having a worm drive portion 5.1 engaging a copper alloy worm wheel 6 in drive relation. As shown in FIG. 2 the shaft 5 is mounted within the housing 1 by a supporting bearing 11 at one end and at its other end the worm shaft 5 is mounted to the housing 1 by a seal 13 and a stainless washer 26 held in place by a stainless steel bolt 20 and by the motor shaft 4.2. The shaft 5 also includes an internal retaining ring 22 and an external retaining ring 23 and an end cap 15. The housing 1 includes a service opening defined by a rubber washer 33 and a stainless steel plug 30. The housing 1 also includes a service opening defined by a rubber washer 32 and a stainless steel plug 25. As shown in FIGS. 1 and 2 the housing 1 is provided with mounting brackets and cooling fins 1.3.

Figure 3:
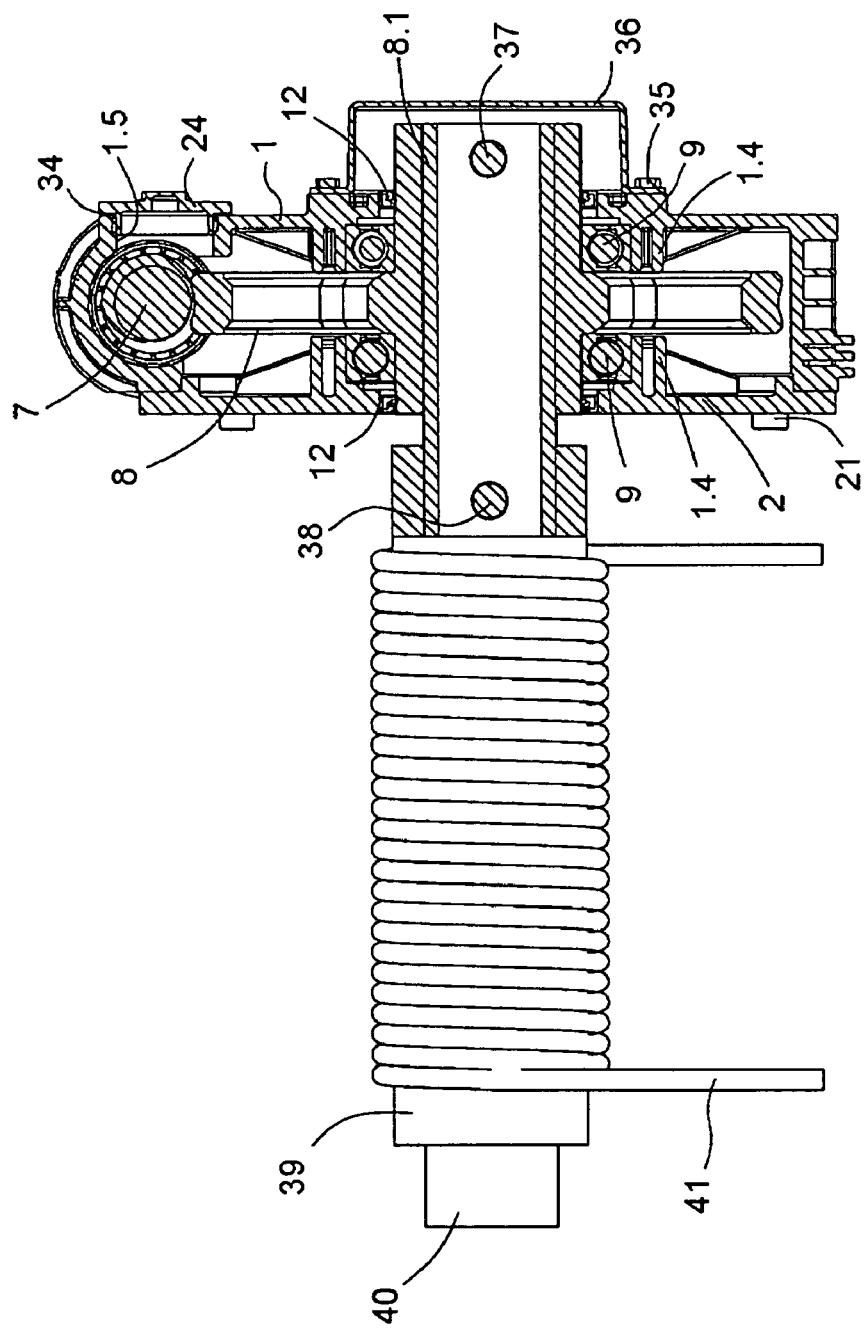
FIG. 3 is a cross sectional view taken on line 3-3 of FIG. 4 showing the second worm wheel and the cable spool.
Figure 4:
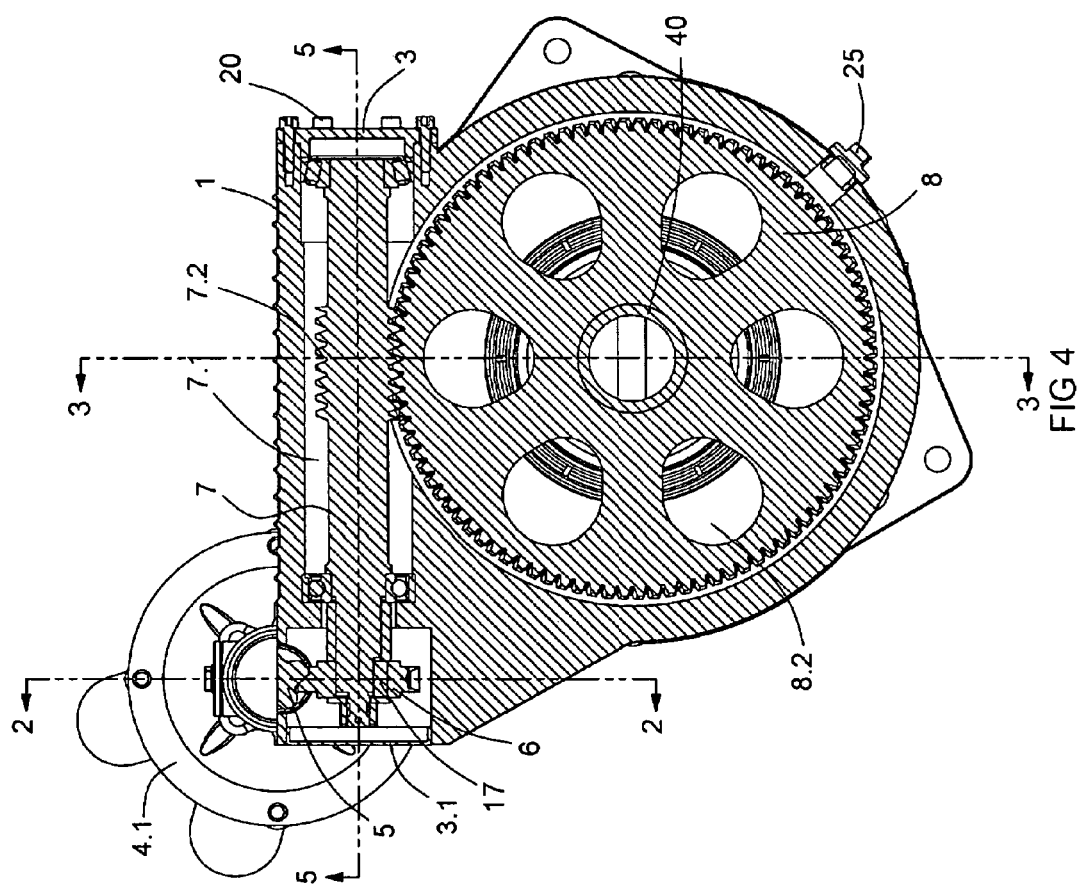
FIG. 4 is a cross sectional view taken through the worm wheel of the second stage.
Figure 5:
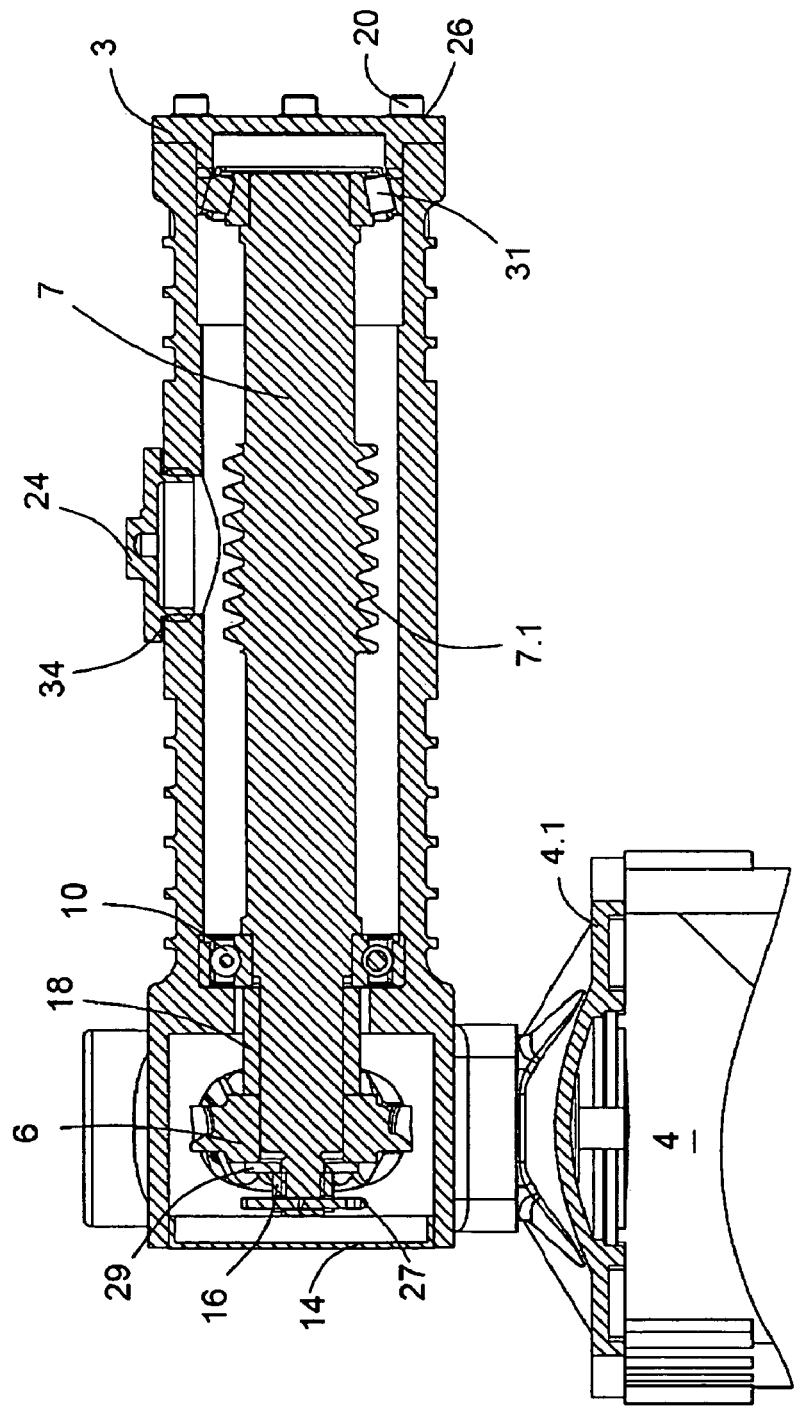
FIG. 5 is a cross sectional view taken on line 5-5 of FIG. 4.
Figure 6:
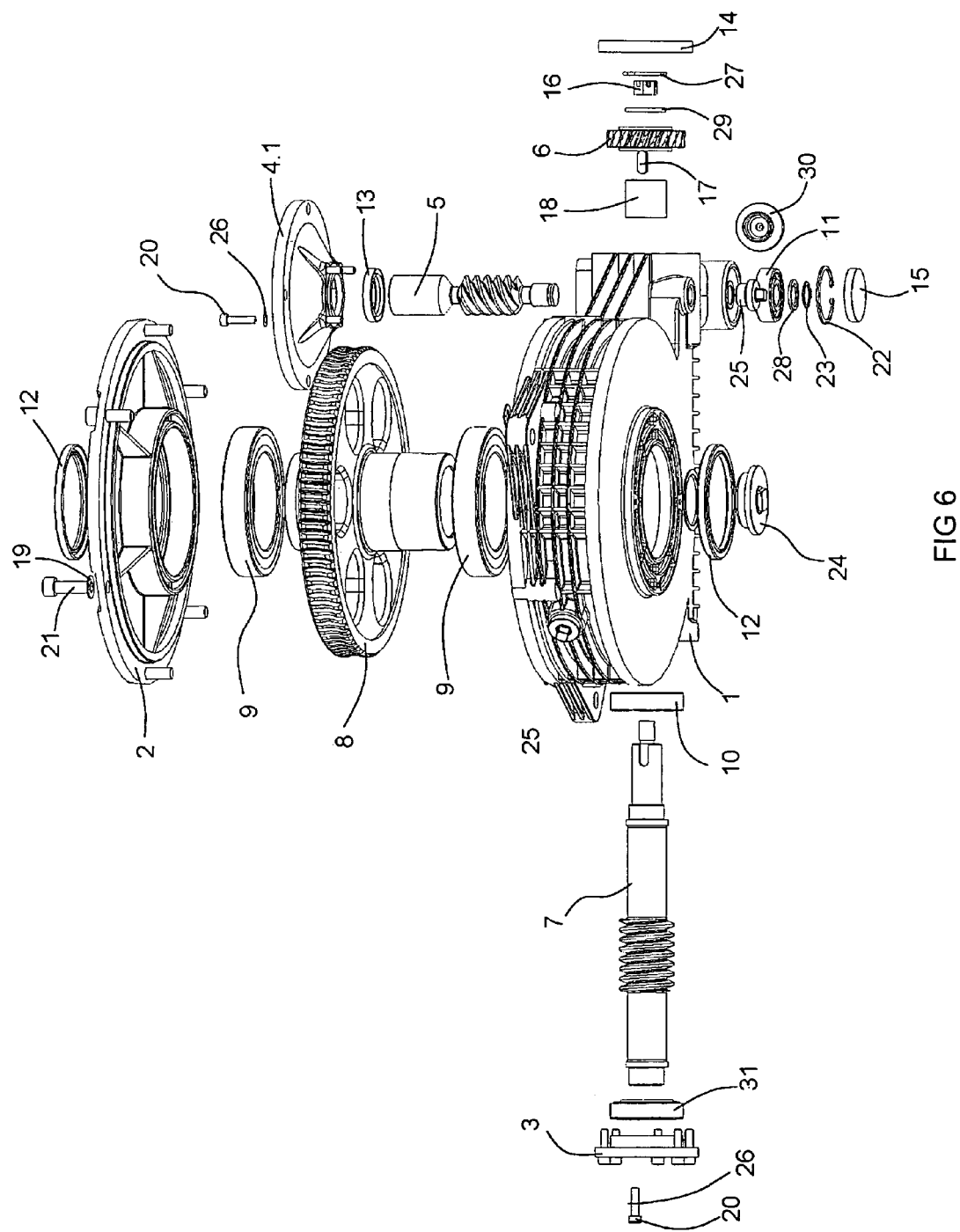
FIG. 6 is an exploded view of the boat lift drive system.

Turning now to FIG. 3 and FIG. 4 the housing 1 provides a mounting for the shaft 7 having the copper alloy intermediate worm portion 7.2 rotating a large ferrous worm wheel 8. The copper alloy intermediate portion and ferrous worm wheel 8 constitute the second stage. The shaft 7 is mounted in a bore 7.1 and engages the worm wheel 8 in drive relation. The shaft 7 extends from end to end of the housing 1 essentially between end cap cover 3 and end cap 3.1. The worm wheel 8 is mounted to shaft 7 in keyed relation, as by key 17 and the shaft 7 has an intermediate portion forming the worm 7.2 by casting the copper alloy worm directly onto the shaft 7 and machining the worm. The worm wheel 8 includes a hub 8.1 which, as best shown in FIG. 3, is supported by bearings 9 carried by the housing 1 within pockets 1.4 provided by the housing 1 and the cover 2 respectively.

The wheel hub 8.1 extends generally between the outer face of the cover 2 and beyond the outer face of the housing 1. As shown in FIG. 3 the hub 8.1 is provided with a spool 39 and a drive tube 40. The spool 39 is attached to the drive tube 40 by bolt 38 and drive tube 40 is attached to hub 8.1 by means of bolt 37. A cover 36 is attached to the housing 1 by bolts 35 in order to provide safety protection and protection to the hub from dirt and moisture. A service opening 1.5 is provided at the upper end of the housing 1, the opening 1.5 including a stainless steel plug 24 and a rubber washer 34. A cable 41, or a plurality of cables, is wound around the spool 39 in order to provide a direct lifting means for a boat cradle (not shown) which constitutes a third stage.

It is believed that the structure of this boat lift apparatus has been fully understood from the above description of parts but for completeness of disclosure the operation and use of the boat lift apparatus will be briefly described with reference to FIGS. 1, 2 and 3. It will be understood that a plurality of drive systems, for example four, may be used to raise and lower a boat cradle (not shown) at each corner and that one end of the cable 41 is operatively attached to the cradle and the other end is operatively attached to the spool 14. A cradle of the type under discussion is disclosed in U.S. Pat. No. 5,769,568, the contents of which are incorporated herein by reference.

As shown in FIG. 1 the operation of the boat lift consists essentially of an electric drive motor 4 which rotates a drive shaft 5 within the housing 1. The drive shaft 5 rotates an intermediately disposed worm 5.1, which engages a worm wheel 6. The worm wheel 6, in turn, drives a shaft 7, which includes a copper alloy worm portion 7.2. This worm 7.2 is engageable with a worm wheel 8 which it rotates at a substantially lower speed. The use of a worm to drive a worm wheel is known but the use of a copper alloy worm to achieve the relative speed reduction is not known in a two stage apparatus of the type under discussion.

There is a considerable savings in the drive quality in using a copper alloy worm for driving at least the worm wheel of one of the two drive stages and particularly the second stage. Copper alloy is well known for use in worm wheels but not for worms of the type described herein. It will be understood that when the electric motor shaft 4.2 is not rotating the related wheel there is an automatic braking effect of the second stage. Also the worm wheel 8 includes a plurality of openings 8.2 to reduce the worm wheel weight.

The worm wheel 8, in the embodiment shown, includes a hub 8.1, which is connected to a drive tube/drive spool combination. A cable 4 is wrapped around the spool 39 which provides, in effect, a third stage and acts to lift a boat cradle for example, and hence the boat carried by the cradle, with much improved efficiency compared with boat lifts which do not use two stage boat lifts in which at least one stage employs a copper alloy worm. Copper alloy may also be used for the first stage worm or worm wheel. Boat lifts of the type under consideration may be adapted to lift a small boat of from 250 pounds to a large boat of 250,000 pounds.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A boat lift drive system for raising and lowering a boat, the system comprising:
    a drive motor having a drive shaft;
    a first shaft connected to the motor drive shaft, the first shaft including a first worm;
    a first worm wheel engageable by the first worm, the first worm wheel rotating a second shaft, a second worm on the second shaft, at least one of said first and second worms being of copper alloy secured to its associated shaft;
    a second worm wheel rotated by the second worm;
    the second worm wheel being operatively connected to a spool having a cable disposed thereabout and operatively disposed for lifting a boat;
    the second worm wheel being ferrous and the second worm being copper alloy.

2. A boat lift drive system for the raising and lowering of a boat, the system comprising:
    a drive motor having a drive shaft;
    a first stage including a copper alloy worm having an axis of rotation aligned with the motor drive shaft; and a ferrous worm wheel;
    a second stage including a ferrous shaft having a copper alloy worm secured to the shaft and a ferrous worm wheel;
    a third stage including a spool operatively connected to the second stage ferrous worm wheel the spool having a cable disposed thereabout and operatively disposed for lifting a boat.

3. A boat lift drive system as defined in claim 2, wherein:
    the spool is driven by the second stage and includes the cable wound around the spool having one end attached to a fixed point and the other end attached to the spool.

4. A boat lift drive system as defined in claim 2, wherein a motor drives the first stage.

5. A boat lift drive system as defined in claim 4 wherein the first stage drives the second stage and the second stage drives the third stage.

* * * * *